United States Patent
Kim

(10) Patent No.: US 10,237,689 B2
(45) Date of Patent: Mar. 19, 2019

(54) METHOD FOR CHANGING UPDATE PERIOD OF LOCATION INFORMATION IN M2M SYSTEM

(71) Applicant: KT CORPORATION, Gyeonggi-do (KR)

(72) Inventor: Mee Jeong Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/509,866

(22) PCT Filed: Sep. 4, 2015

(86) PCT No.: PCT/KR2015/009345
§ 371 (c)(1),
(2) Date: Mar. 9, 2017

(87) PCT Pub. No.: WO2016/039549
PCT Pub. Date: Mar. 17, 2016

(65) Prior Publication Data
US 2017/0257741 A1    Sep. 7, 2017

(30) Foreign Application Priority Data

Sep. 12, 2014  (KR) .................. 10-2014-0121396
Sep. 19, 2014  (KR) .................. 10-2014-0125283
(Continued)

(51) Int. Cl.
*H04W 4/02*    (2018.01)
*H04W 4/70*    (2018.01)

(52) U.S. Cl.
CPC .............. *H04W 4/023* (2013.01); *H04W 4/70* (2018.02)

(58) Field of Classification Search
CPC ..... H04W 4/005; H04W 4/023; H04W 4/001; H04W 8/08; H04W 4/02; H04W 4/029;
(Continued)

(56) References Cited

U.S. PATENT DOCUMENTS 8,509,815 B1 * 8/2013 Shojayi .................. H04W 4/02
                                                      455/456.3
2011/0217982 A1 * 9/2011 Zhao ...................... H04W 60/04
                                                      455/437
(Continued)

FOREIGN PATENT DOCUMENTS

WO    2012/111952 A2    8/2012
WO    2012/115406 A2    8/2012
WO    2014/012567 A1    1/2014

OTHER PUBLICATIONS

LG Electronics et al., "Detail Procedure for Location Management", TP#8, Miyazaki, Japan, Dec. 11, 2013, 1-6.
(Continued)

Primary Examiner — Timothy Pham
(74) Attorney, Agent, or Firm — IP Legal Services, LLC

(57) ABSTRACT

The present invention relates to a machine to machine communication (M2M) technique, and to a technique for changing an update period of location information in an M2M system. In particular, the present invention relates to a method and a device for allowing a common service entity to dynamically set an update period of location information in an M2M system.

17 Claims, 19 Drawing Sheets

(30) Foreign Application Priority Data

Sep. 25, 2014 (KR) ........................ 10-2014-0128064
Sep. 3, 2015 (KR) ........................ 10-2015-0124835

(58) Field of Classification Search
CPC ......... H04W 64/00; H04W 4/70; H04W 4/08;
H04W 92/18; H04W 28/06; H04W 28/18;
H04W 48/16; H04W 8/186; H04L 29/02;
H04L 29/08; H04L 51/20; H04L 61/2076;
Y02D 70/1262; Y02D 70/21
USPC ...................................................... 455/456.1
See application file for complete search history.

(56) References Cited

U.S. PATENT DOCUMENTS

| | | | |
|---|---|---|---|
| 2013/0244695 A1* | 9/2013 | Park ....................... | H04W 4/005 455/456.1 |
| 2013/0297551 A1* | 11/2013 | Smith ....................... | G06N 5/02 706/48 |
| 2013/0310016 A1 | 11/2013 | Park et al. | |
| 2013/0324157 A1 | 12/2013 | Park et al. | |
| 2014/0044034 A1 | 2/2014 | Park et al. | |
| 2014/0226557 A1* | 8/2014 | Lee ....................... | H04W 4/005 370/312 |
| 2014/0307618 A1* | 10/2014 | Kim ....................... | H04W 4/06 370/312 |
| 2015/0080016 A1* | 3/2015 | Smith ................. | H04L 65/1006 455/456.1 |
| 2015/0141045 A1* | 5/2015 | Qiu ....................... | H04W 4/021 455/456.1 |
| 2016/0084933 A1 | 3/2016 | Smith et al. | |
| 2016/0323729 A1 | 11/2016 | Smith et al. | |
| 2017/0105107 A1 | 4/2017 | Smith et al. | |
| 2018/0115881 A1 | 4/2018 | Smith et al. | |

OTHER PUBLICATIONS

LG Electronics, "Clean Up of <locationPolicy> Resource", TP#12, Sophia Antipolis, France, Jul. 30, 2014, pp. 1-6.
Qualcomm Incorporated, "TS-0004 Section 7.3 Cleanup", Pro#11. 4, Jul. 4, 2014, pp. 1-31.

* cited by examiner

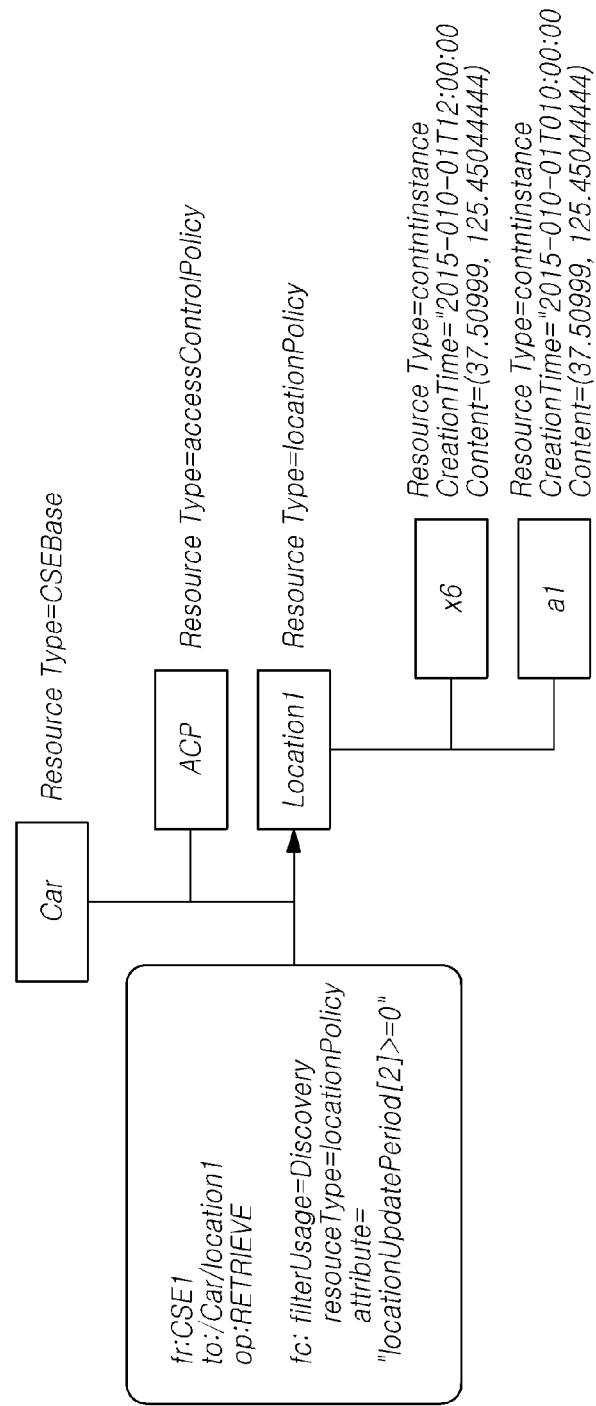

METHOD FOR CHANGING UPDATE PERIOD OF LOCATION INFORMATION IN M2M SYSTEM

CROSS REFERENCE TO RELATED APPLICATIONS

This application is a National Stage Patent Application of PCT International Patent Application No. PCT/KR2015/009345 (filed on Sep. 4, 2015) under 35 U.S.C. § 371, which claims priority to Korean Patent Application Nos. 10-2014-0121396 (filed on Sep. 12, 2014), 10-2014-0125283 (filed on Sep. 19, 2014), 10-2014-0128064 (filed on Sep. 25, 2014) and 10-2015-0124835 (filed on Sep. 3, 2015), the teachings of which are incorporated herein in their entireties by reference.

TECHNICAL FIELD

The present invention relates an M2M (Machine to Machine Communication) technology that changes an update period of location information in an M2M system. More particularly, the present invention relates to a method and an apparatus for dynamically setting an update period of location information by a common service entity in an M2M system.

BACKGROUND ART

Communication of things (M2M (Machine to Machine communication), MTC (Machine Type Communication), smart device communication, machine oriented communication, or Internet of things) refers to all types of communication schemes in which communication is performed without intervention of a person in a communication process. Recently, oneM2M is having a discussion about M2M, but has not presented technical factors that fulfill architecture and requirements of the oneM2M.

Further, the M2M system may provide various services using device location information. However, a detailed procedure or method for acquiring the device location information has not been provided.

DETAILED DESCRIPTION OF THE INVENTION

Technical Problem

In the aforementioned background, the present invention provides a detailed procedure for flexibly using and identifying location information of the device through various period policies in an M2M system.

Further, the present invention provides a method and an apparatus capable of preventing an increase in unnecessary data loads and power consumption by dynamically changing a period on which location information is acquired.

In addition, the present invention provides a technology for changing a period for acquiring location information to be suitable for an M2M environment.

Technical Solution

The present invention made to solve the above technical problem provides a method of acquiring location information by the common service entity. The method includes: generating location policy resources according to a request of an originator; making a request for location information of a device to a network service entity according to location update period information included in the location policy resources; and changing the location update period information based on at least one piece of the location information received from the network service entity and state information of the device.

The present invention provides a method of providing location information by a network service entity. The method includes: receiving a request for location information of a device from a common service entity based on a period determined according to location update period information; and transferring the location information of the device to the common service entity, wherein the common service entity dynamically changes the location update period information based on at least one piece of the location information of the device and state information of the device.

The present invention provides a common service entity for acquiring location information. The common service entity includes: a controller configured to generate location policy resources according to a request of an originator; and a transmitter configured to make a request for location information of a device to a network service entity according to location update period information included in the location policy resources, wherein the controller changes the location update period information based on at least one piece of the location information received from the network service entity and state information of the device.

The present invention provides a network service entity for providing location information. The network service entity includes: a receiver configured to receive a request for location information of a device from a common service entity based on a period determined according to location update period information; and a transmitter configured to transfer the location information of the device to the common service entity, wherein the location update period information is dynamically changed by the common service entity based on at least one piece of the location information of the device and state information of the device.

Effects of the Invention

According to the present invention, there is an effect of providing a detailed procedure for flexibly using and identifying location information of the device through various period policies in an M2M system.

Further, according to the present invention, there is an effect of providing a method and an apparatus capable of preventing an increase in unnecessary data loads and power consumption by dynamically changing a period on which location information is acquired.

In addition, according to the present invention, there is an effect of providing a technology for changing a period for acquiring location information to be suitable for an M2M environment.

BRIEF DESCRIPTION OF THE DRAWINGS

FIG. 14 illustrates an example to which the present invention is applied;

MODE FOR CARRYING OUT THE INVENTION

Figure 1:
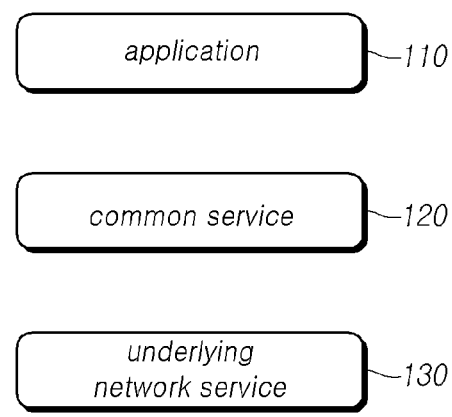
FIG. 1 illustrates a configuration of a system according to the present invention.

Hereinafter, exemplary embodiments of the present invention will be described with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. If a component is described as 'connected', 'coupled', or 'linked' to another component, one of ordinary skill in the art would understand the components are not necessarily directly 'connected', 'coupled', or 'linked' but also are indirectly 'connected', 'coupled', or 'linked' via a third component.

Embodiments of the present invention are described mainly based on communication of things. The communication of things may be called various terms such as M2M (Machine to Machine communication), MTC (Machine Type Communication), IoT (Internet of Things), Smart Device Communication (SDC), and machine oriented communication. Recently, oneM2M presents many technical matters related to M2M communication. M2M communication refers to various communication performed without intervention of a person in a communication process. M2M communication is divided into an energy field, an enterprise field, a healthcare field, a public service field, a residential field, a retail field, a transportation field, and other fields. The present invention includes the fields and can be applied to other fields.

FIG. 1 illustrates a configuration of a system according to the present invention. The system illustrated in FIG. 1 includes an application 110, common services 120, and underlying network services 130 (this layered model comprises three layers: Application Layer, Common Services Layer and the Underlying Network Services Layer). They include an application layer, a common service layer, and a network service layer, respectively. The application layer includes a business logic and an operational logic related to oneM2M applications. The common service layer includes a oneM2M service function that operates the oneM2M application. To this end, management, discovery, and policy enforcement are applied.

A common service entity corresponds to an implementation example (instantiate) of a common service function. The communication service entity provides a subset of the common service function to be used and shared by the M2M application. The common service entity uses an underlying network function and interacts with another common service entity, so as to implement a service.

Figure 2:
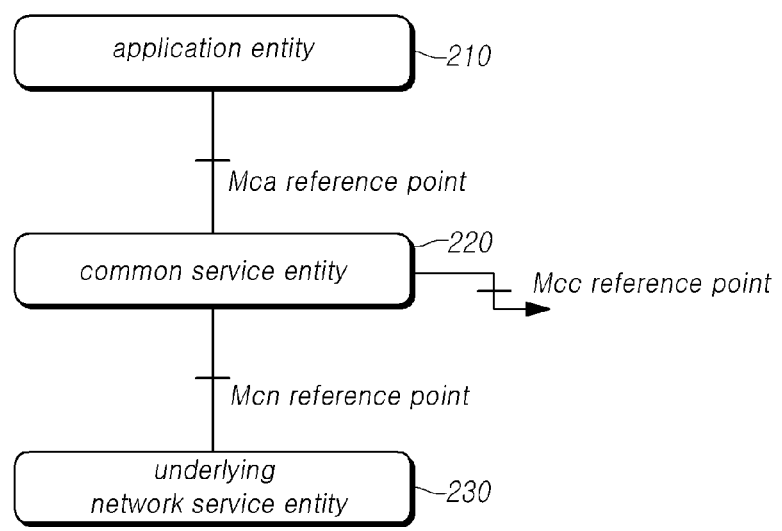
FIG. 2 illustrates a system according to the present invention in terms of a function of a higher level.

FIG. 2 illustrates a system according to the present invention in terms of a function of a higher level. An Application Entity (AE) 210 provides an application logic for end-to-end M2M solutions. For example, the AE 210 may be a fleet tracking application such as vehicles, a remote blood sugar monitoring application, or a remote power metering and controlling application. A Common Service Entity (CSE) 220 is a set of service functions and the service functions correspond to functions used in an M2M environment in common. The service function may become different functions through reference points such as Mca and Mcc, and uses an underlying network service based on the reference point Mcn. For example, the service functions may be data management, device management, M2M subscription management, and a location service. A sub function provided by the CSE may be logically understood as a Common Service Function (CSF). Some of the CSFs within the CSE of a oneM2M node may be mandatory and some may be optional. Similarly, sub functions within the CSFs may be also mandatory or optional.

An underlying Network Service Function (NSF) 230 provides services to the common service entity. For example, the services include device management, location services, and device triggering.

Reference points are supported by the common service entity (CSE), and the reference point Mca indicates a communication flow between an application entity and a common service entity. The reference point Mcc indicates a communication flow between two common service entities. The reference point Mcn indicates a communication flow between the common service entity and one network service entity.

More specifically, the reference point Mca allows one application entity (AE) to use the services supported by the common service entity. The services provided through the reference point Mca may be dependent on the functions provided by the communication service entity, and the application entity and the common service entity may exist in the same physical entity or separately exist in different physical entities. The reference point Mcc allows a common service entity that desires to use a service of another common service entity that provides a required function to use the service. The services provided through the reference point Mcc are dependent on the functions provided by the common service entity. The reference point Mcc may be supported between different M2M nodes. The reference point Mcn allows a common service entity that desires to use an underlying network service entity that provides a required function to use it, and provides services other than transport and connectivity. An instance of the reference point Mcn is implemented to be dependent on the services provided by the underlying network. Information exchange between two physical M2M nodes may use underlying network transport and connectivity services that provide basic services.

In the specification, the common service entity may be described as the CSE and the network service entity may be described as the NSE.

Figure 3:
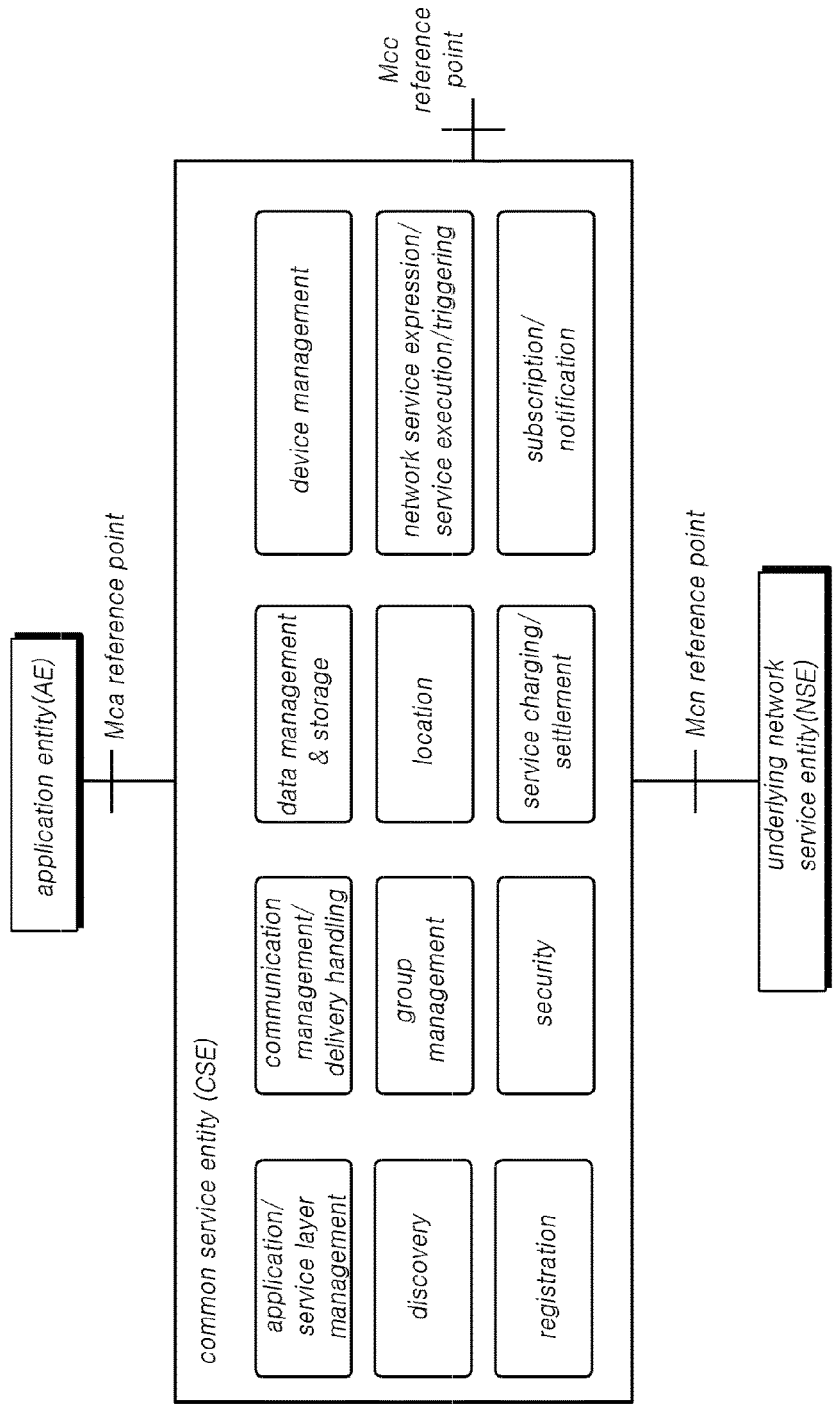
FIG. 3 illustrates a configuration of a common service entity according to an embodiment of the present invention.

FIG. 3 illustrates a configuration of a common service entity according to an embodiment of the present invention. The common service entity in FIG. 3 includes a function of processing identification information.

As illustrated in FIG. 3, functions provided by the common service entity include application/service layer management, data management and repository, location, security, communication management/delivery handling, registration, service session management, device management, subscription/notification, connectivity management, discovery, service charging/accounting, network service exposure/service execution and triggering, and group management.

Of course, the functions may include semantics, data analytics, application enablement, and network service function management as well as the above functions.

Each of the functions is described below.

ASM (Application and Service Layer Management) serves to manage the AE and the CSE of ADN, ASN, MN, and IN and includes a configuration of the CSE, troubleshooting, an upgrade function, and an upgrade of the AE.

CMDH (Communication Management and Delivery Handling) takes responsibility for communication between different CSEs, AEs and NSEs. The CMDH is responsible for determining at which time and using which communication connection the communication will be transferred, determining when the communication is needed and allowed, and storing a communication request when the transfer of communication is delayed until later. The CMDH is performed according to a provisioned policy specified for each request for communication and a delivery handling parameter. In communication using the underlying network data transmission service, the underlying network may support the same delivery handling function. In this case, the CMDH may use the underlying network, and operate as a front end of the underlying network to access the same delivery handling function.

A DMR (Data Management and Repository) may allow an M2M application to exchange data with another entity. A DMR CSF provides a data storage space and provides a function for controlling the same. Further, the DMR CSF includes a function of collecting and combining a large amount of data, changing the data into a particular format, or analyzing and storing the data for semantic processing. "Data" may refer to raw data transparently extracted from the M2M device or processed data calculated or combined by the M2M entity. The collection of a large amount of data is known as a big data storage function.

A DMG (Device Management) CSF serves to manage device functions of devices in an MN, a device node, and an M2M area network. Devices that provide one or more following functions can be managed. The functions include installation and settings of application software, configuration settings and provisioning, firmware update, logging, monitoring, analysis, management of topology of an area network, and devices within management of the area network.

A DIS (discovery) CSF serves to search for information and resources corresponding to a right (including permission in M2M service subscription) permitted within a given range and subject and a request from the originator within a given range. The originator may be an application or another CSE. The range of the search may be one CSE or a plurality of CSEs. A discovery result returns to the originator.

GMG (Group Management) handles a group associated with the request. The request is transmitted to manage the group and membership of the group and also serves as a bulk operation supported by the group. When a member is added to or deleted from the group, it may be needed to identify whether the member accords with the purpose of the group. The bulk operation includes read, write, subscribe, inform, and device management. Requests and subscriptions are performed through the group, and the group serves to combine the requests and notifications. Members of the group play the same role for a right to access resources. In this case, an access control is performed by the group. When the underlying network provides a broadcasting function and a multicasting function, the GMG CSF should use such functions.

A LOC (Location) CSF allows an M2M AE to acquire geographical location information of an M2M node (for example, ASN or MN) for a location-based service. A request for the location information may be made from M2M AEs existing within the same or different M2M nodes.

An NSE (Network Service Exposure) CSF manages communication with the underlying network to access a network service function through an Mcn reference point through an available or supportable scheme for a service request from an M2M system instead of an M2M application. The NSE CSF conceals another CSF and an AF from a particular technology and mechanism supported by the underlying network. Network service functions provided from the underlying network include device triggering, small data transmission, location notification, policy rule settings, location inquiry, IMS service, and device management, but are not limited thereto. The functions do not include a general transmission service.

REG (Registration) serves to handle registration of an application or another CSE in the CSE, and allows an entity which desires to use a service provided by the CSE to be registered. The REG CSF handles registration of device characteristics/attributes as well as registration of the device in the CSE.

SEC (Security) provides a data handling function requiring attention (sensitive), a security operation function, a security combination setting function, an authorization and access control function, and an identification protection function. The sensitive data handling function provided by the SEC CSF provides a function of protecting a local credential that is required to be secured in a storage and control process. The sensitive data handling function also uses a security algorithm. The function supports a security environment in which various encryption schemes are separated. The security operation function provides the following functions. First, the security operation function provides a function of generating and operating a security environment dedicated to be supported by the sensitive data handling function. Further, the security operation function supports post provisioning of a root credential protected in the security environment, and also supports provisioning and operation of subscription related to an M2M service and an M2M application service. The security combination setting function enables confidentiality, integrity, authentication, and authorization by setting a security combination between M2M nodes. The authorization and access control function controls a service and data access to an authorized entity according to a provisioned security policy and an assigned rule. A unique identifier of the entity may be used for the authorization, and the identification protection function may provide anonymity to function as a temporary identifier to be not linked with actual identification information combined with the entity or user.

SCA (Service Charging and Accounting) provides a charging function of a service layer. The SCA supports different charging models including online charging and offline charging. The SCA CSF guarantees an event to be charged, stores information, and generates charging records and charging information. The SCA CSF may interact with a charging system of the underlying network. However, the SCA CSF has responsibility for generating and recording charging information of a final service level. The SCA CSF of an underlying node or a service layer charging server has responsibility for handling charging information for the charging.

SSM (Service Session Management) CSF manages an M2M service session corresponding to an end-to-end service layer connection. The SSM CSF manages an M2M service session between M2M applications, between an M2M application and a CSE, or between CSEs. The management of the M2M service session includes management of a session state, session authentication and establishment, a connection of an underlying network related to the session and service management, control of session extension of a CSE corresponding to a multi-hop of the CSE, exchange of information between session ends, and end of the session. Within the given M2M service session, the SSM CSF uses CMDH CSF within a local CSE for message transmission/reception from a next hop CSE or an application. The SSM CSF uses an SEC CSF to manage a session related to a security credential and authentication of a session participant. The SSM CSF generates a charging event specified for a session and communicates with SCA CSF within the local CSE.

SUB (Subscription and Notification) provides a notification to maintain subscription and tracks a change in resources (for example, deletion of resources). The subscription of resources is started by the M2M AE or the CSE and access rights thereof are granted by the hosting CSE. When the subscribed resources are changed during the activated subscription, the hosting CSE transmits a notification to an address at which a resource subscriber desires to receive the notification.

FIG. 3 and the description thereof are embodiments for implementing the common service entities and the present invention is not limited thereto.

Figure 4:
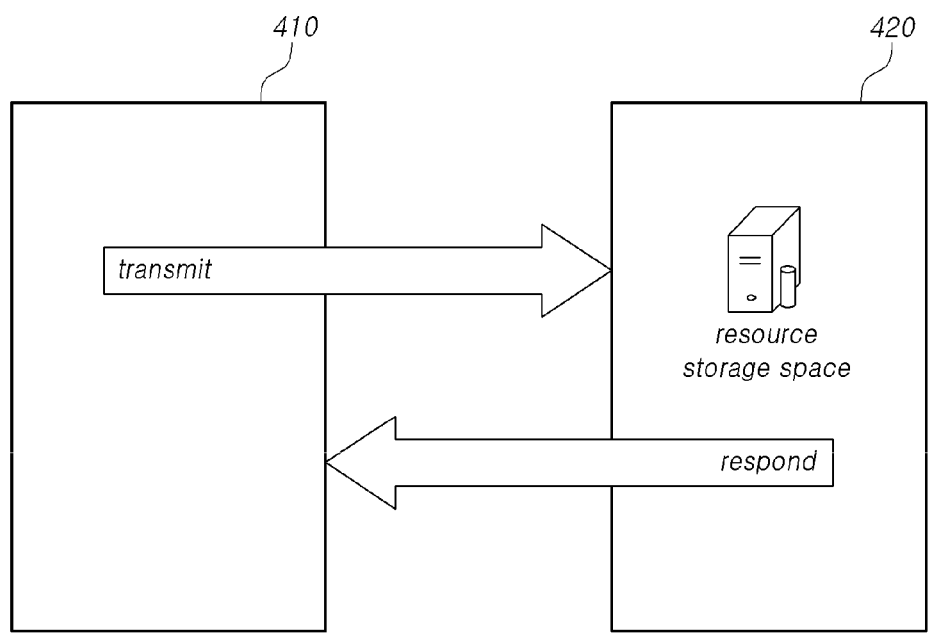
FIG. 4 illustrates a communication flow in a reference point according to an embodiment of the present invention.

FIG. 4 illustrates a communication flow in a reference point according to an embodiment of the present invention.

A reference numeral 410 indicates an originator and a reference numeral 420 indicates a receiver. Information exchange between the two entities is performed through a reference point Mca between an application and a CSE or performed through a reference numeral Mcc between CSEs. Further, the information exchange is performed through sending and responding. A sending request is made from the originator 410 to the receiver 420 and includes the following information.

"Operation" corresponds to an operation to be executed and includes C (Create), R (Retrieve), U (Update), D (Delete), and N (Notify). "To" denotes an address of a target resource and "from" denotes an address of resources indicating the originator. "Hd" corresponds to a header including meta information for a transmission request and "content" denotes contents to be transmitted.

oneM2M presents overall system requirements, management requirements, data model and semantics requirements, security requirements, charging requirements, and operational requirements as requirements to be met to implement the system.

In the specification, M2M, that is, more particularly, oneM2M will be mainly described. However, the description is not limited to M2M and can be applied to all systems and structures that provide D2D communication, that is, M2M communication and communication generated in the systems.

When location information of a particular device is updated in the current M2M environment, the location information is acquired according to a location update period value corresponding to an attribute value of <locationPolicy> resources configured by the originator having made a request for the location information. The location information update period value may have no value or may be set as one value. When the location information update period is changed, a method is used of updating the entirety of <locationPolicy> resources including the content that the originator making the request for the location information desires to change.

However, in the current M2M environment, the location information can be updated only by a single value of locationUpdatePeriod generated in a service node. Accordingly, there is a problem in that the value should be newly set by the originator whenever the period for updating the location information is changed. Therefore, in the M2M environment requiring mobility, a user using the originator should acquire information based on a fixed period value whenever acquiring the location information of the device having a variable speed, and thus much power is consumed and it is inefficient according to characteristics and states of the device. Further, there may be inconvenience to newly set a value every time to acquire accurate location information. For example, in a case of a tracking service for discovering a path of a target device (for example, a vehicle, a mobile phone, or a robot) having a variable speed in a network environment, the user acquires information of the target device according to an initially set update period. In an environment in which the device moves at a constant speed, acquiring the location information according to the set value is not a big problem. However, when location information is rapidly changed within a short time, a target device such as a vehicle having a large change in mobility should continuously update the location information from the originator. Accordingly, it is very cumbersome and inefficient for the user to acquire the location information.

A method of dynamically changing the location update period by the common service entity according to the present invention made to solve the above problem will be described below.

Figure 5:
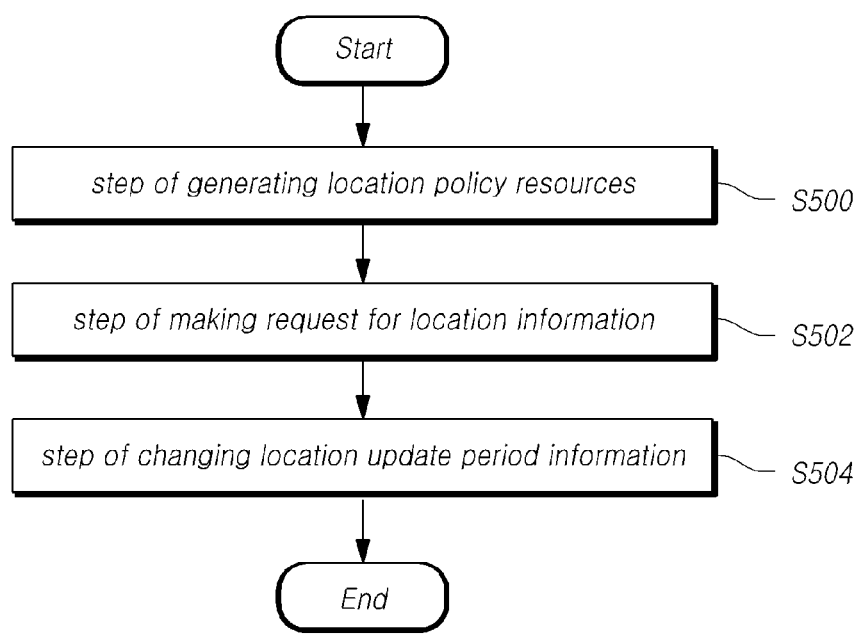
FIG. 5 illustrates an operation of the common service entity according to an embodiment of the present invention.

FIG. 5 illustrates an operation of the common service entity according to an embodiment of the present invention.

A method of acquiring location information by the common service entity according to an embodiment of the present invention may include a step of generating location policy resources according to a request of an originator, a step of making a request for location information of a device to a network service entity according to location update period information included in the location policy resources, and a step of changing the location update period information based on at least one piece of the location information received from the network service entity and state information of the device.

Referring to FIG. 5, the method may include step S500 in which the common service entity generates the location policy resources according to the request of the originator to acquire the location information. The location policy resources may be generated and registered in the common service entity according to the request of the originator. The location policy resources include a plurality of pieces of attribute information and child resources. For example, the location policy resources may include one or more pieces of location source attribute information, location update period attribute information, location target identification attribute information, location server attribute information, location container identification attribute information, location container name attribute information, and location state attribute information. The location policy information may be changed according to a request for updating the location policy information from the originator.

The method may include step S502 in which the common service entity makes a request for location information of the device to the network service entity according to location update period information included in the location policy resources. For example, the location update period information may include list information including one or more location update period values. That is, the location update period information may include one or more location update period values, and the location update period values may be included in a list form. According to another embodiment, the location update period information may include period set attribute information including one or more location update period sets that have been classified and configured according to each type of state information of the device. That is, the location update period information may include location update period sets according to each type of state information of various devices such as a power state, a movement speed state, and an application execution state of the device providing location information. The location update period set may be included in period set attribute information. The period set attribute information may be included as lower attribute information of the location update period information. Further, each of the location update period sets may be list information including one or more location update period values set according to the state information of the device. According to another example, the location update period information may include period element attribute information including the location update period value applied to the making of the request for the location information of the device to the network service entity. That is, the location update period information may include period element attribute information as lower attribute information, and the period element attribute information may include information on the location update period value currently applied by the common service entity.

Meanwhile, the method may include step S504 in which the common service entity changes the location update period information based on at least one piece of the location information received from the network service entity and the state information of the device. For example, the state information of the device may include at least one piece of power information, speed information, absolute location information, relative location information of a previous location, time information, and application execution information. For example, the power information may include information on a battery of the device. Further, the state information of the device may be added or changed according to settings. Alternatively, the state information of the device may be set differently according to each device based on characteristics of the device. Alternatively, the state information of the device used for changing the location update period information may consist of information included in devices in common. The common service entity may change the location update period based on at least one piece of the location information received from the network service entity and the state information of the device. When the location update period is changed, the common service entity may make a request for the location information according to the changed location update period. The changed location update period value may be selected from a list included in the location update period information or from a set included in the period set attribute information. Further, the common service entity may change the location update period based on at least one piece of the location information and the state information of the device even when there is no update of the location update period information of the originator. That is, the common service entity may independently change the location update period value for making the request for the location information by itself without intervention of the originator.

For example, the common service entity may change the location update period information based on absolute location information of the device or relative location information of a previous location included in the state information of the device. That is, the location update period may be changed into a location update period value mapped to the absolute location or relative location of the device. According to another example, the common service entity may change the location update period information based on the time information included in the state information of the device. Specifically, the common service entity may identify the time information included in the state information of the device and change the location update period to a particular time. According to another example, the common service entity may change the location update period to a preset particular time zone based on the time information included in the state information of the device.

As described above, the common service entity according to the present invention may dynamically change the location update period based on the state information of the device without the update request from the originator. Further, the common service entity according to the present invention may dynamically change the location information update period based on the state or location information of the device. Accordingly, an effect of preventing resource waste and setting the update period suitable for a device environment is provided by changing the location update period without the update of all location policy resources.

Hereinafter, detailed embodiments for changing the location update period information according to the present invention will be described in more detail with reference to the drawings. The embodiments described below may be combined with each other.

The present invention includes each embodiment of a method by which the user can efficiently use location information according to a state of the device by dynamically changing a location update period value of the device according to a situation (a movement speed or a battery state).

Figure 6:
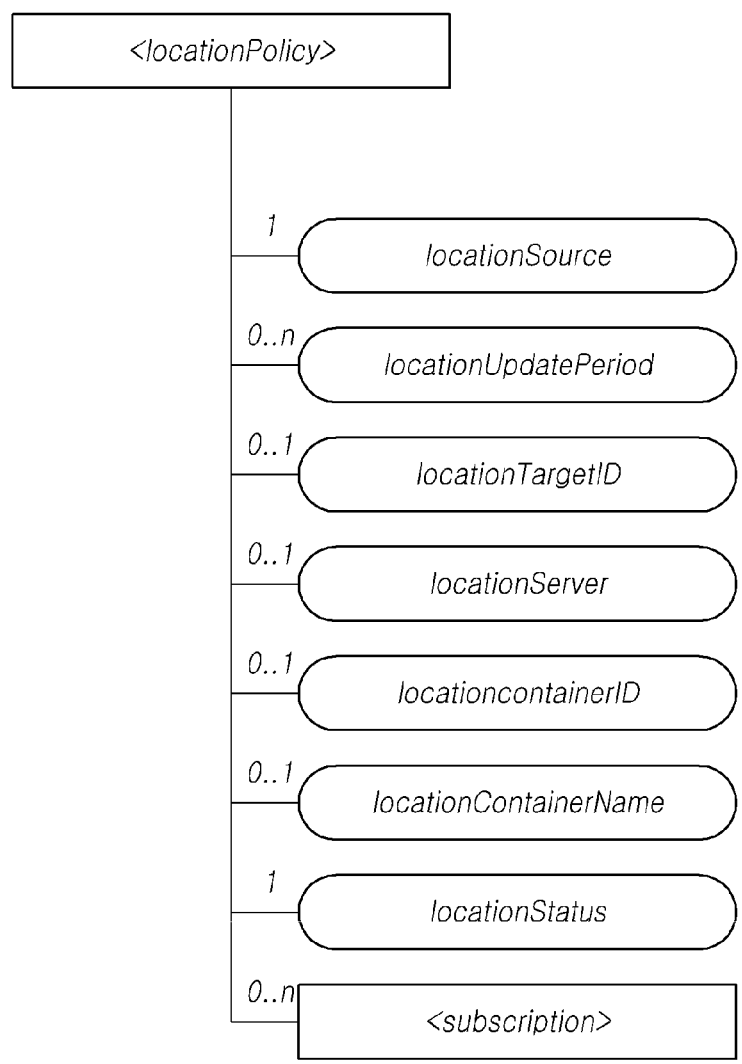
FIG. 6 illustrates an example of a configuration of <locationPolicy> resources according to the present invention.

FIG. 6 illustrates an example of a configuration of <locationPolicy> resources according to the present invention.

Referring to FIG. 6, the <locationPolicy> resources of the present invention includes location update period information as lower attribute information. Further, the location update period information may include n values. That is, the conventional location update period information may include a value of 0 or 1, that is, one location update period value. Accordingly, the common service entity cannot dynamically change the location update period information, and the originator having made the request for generating the <locationPolicy> resources can update all of the <locationPolicy> resources.

Therefore, the location update period information according to an embodiment of the present invention may include n values, and the common service entity can dynamically change and apply the location update period value based on the n values.

Figure 7:
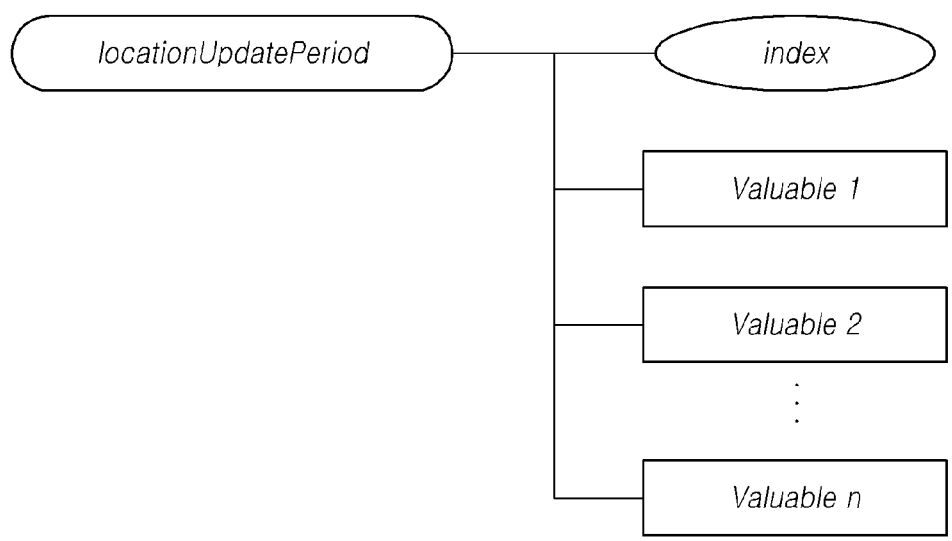
FIG. 7 illustrates an example of locationUpdatePeriod attribute information according to the present invention.

FIG. 7 illustrates an example of locationUpdatePeriod attribute information according to the present invention.

Figure 9:
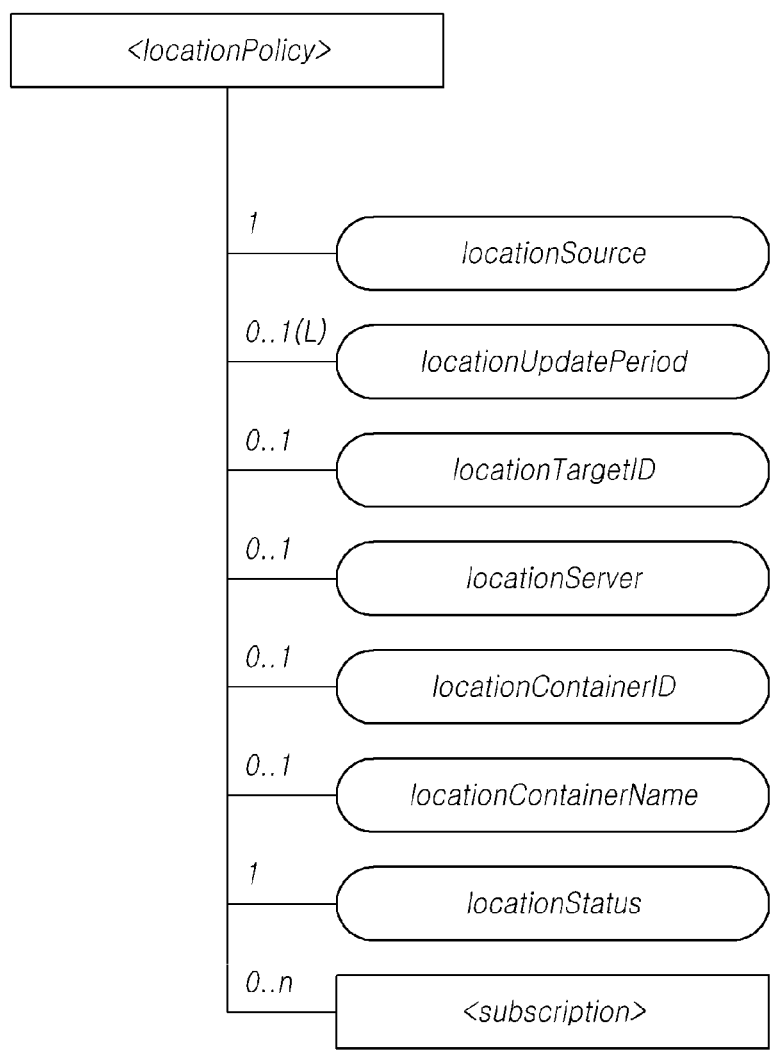
FIG. 9 illustrates another example of the configuration of the <locationPolicy> resources according to the present invention.

Referring to FIG. 7, location update period (locationUpdatePeriod) information may include index information corresponding to child resources. A value (valuable) selected from setting values (valuable) available according to a situation may be set as the index information. That is, the index information indicates a currently selected and applied location update period value. Further, the location update period information may include n location update period values. In FIG. 9, the n location update period values include valuable 1, . . . , and valuable n.

Figure 8:
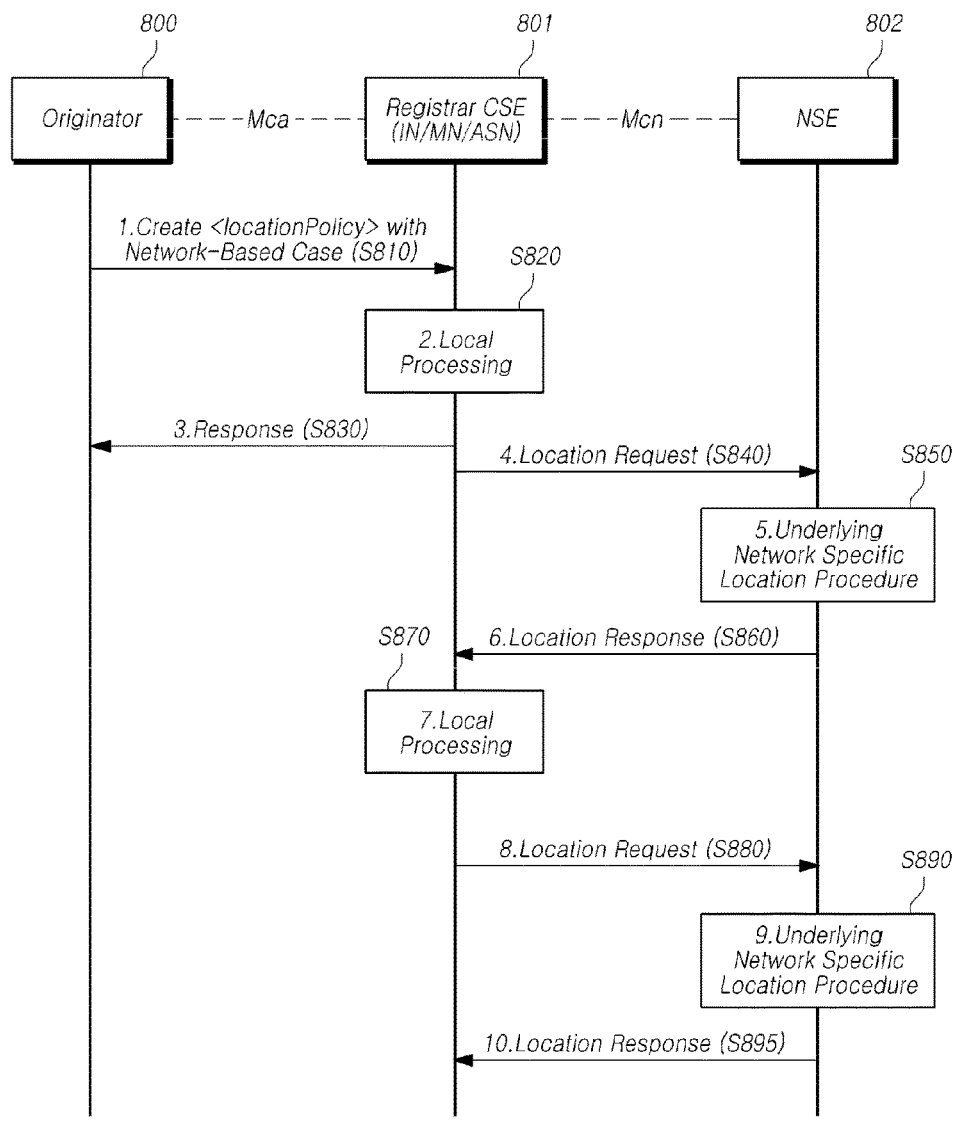
FIG. 8 illustrates a process of acquiring location information according to an embodiment of the present invention.

FIG. 8 illustrates a process of acquiring location information according to an embodiment of the present invention.

The process of acquiring the location information based on the <locationPolicy> resources and the location update period information of the present invention described with reference to FIGS. 6 and 7 will be described step by step.

1. Step of Making a Request for Generating <locationPolicy> Resources

An originator 800 may make a request for generating location policy resources to a common service entity 801 in 5810. The location policy resources may be configured as described with reference to FIG. 8. For example, a locationSource value among attribute values of the location policy resources may be set as a network-based value. Further, other attribute information values including location update period information may be set according to the originator 800, a target device, and a location server.

2. Step of Generating <locationPolicy> Resources

The common service entity 801 may receive the request to identify a right and may generate <locationPolicy> resources in S820. That is, the CSE 801 identifies the right of the originator 800 and, when the right is valid, generates the <locationPolicy> resources according to the request.

3. Step of Notifying of the Generation of the <locationPolicy> Resources

The common service entity 801 notifies the originator 800 that the <locationPolicy> resources have been generated in S830.

4. Step of Making a Request for Location Information

The common service entity 801 makes a request for location information of the device to a Network Service Entity (NSE) 802 by applying a value of location update information (locationUpdatePeriod). For example, when an initial index value of the location update information is set as 100 seconds, the request for the location is made every 100 seconds.

5. Step of Performing a Location Information Process of the NSE

The NSE 802 receives the request for the location information from the CSE 801 and performs a location information process of a device or a network node corresponding to a target in S850. The location information process of the NSE 802 may be performed in various methods and performed according to preset operations.

6. Step of Notifying of Location Information

The NSE 802 transfers the location information generated through step S850 to the CSE 801 in 5860. The location information may be transferred in response to the request for the location information.

7. Step of Changing a Location Update Period

The CSE 801 changes a location update period value based on location information received from the NSE 802, resources related to a location update period, and device state information in S870. For example, the CSE 801 may select one of the various valuable values described with reference to FIG. 9 according to a preset condition and use the corresponding valuable value as the location update period value.

8. 8. Step of Making a Request for Location Information

By applying the location update information value selected in step S870, a request for the device location information is made in S880. For example, when the changed index value is set as 200 seconds, the request for the location information may be made every 200 seconds.

9. Step of Performing an Internal Process for Generating Location Information

The NSE 802 receives the request for the location information from the CSE 801 and preforms a location information process of a device or a network node corresponding to a target in S890. The process may be performed equally to step S850.

10. Step of Notifying of Location Information

The NSE 802 transfers the generated location information to the CSE 801 in S895. Thereafter, steps S870 to S895 are repeated.

Meanwhile, the present invention may be applied to all cases where the originator 800 and the CSE 801 are executed in different application domains and they exist in the same device. For example, when the originator 800 and the CSE 801 are executed in different application domains, through the device, a location tracking service may be supported to provide a location of a movable application such as a vehicle, a robot, or a terminal by a module related to location information included in a GPS and an M2M terminal. According to another example, the originator 800 and the CSE 801 may exist in the same device and location information may be supported by the module related to the location information included in the GPS and the M2M terminal. A case where location information of mobile phone is supported using radio waves of a base station may be assumed as a most representative example. According to the conventional method, an application user or the originator 800 may feel cumbersomeness in that the update period should be frequently changed or the period should be updated at a resource level. However, the present invention can be applied to the two cases and, in this case, the aforementioned problem can be solved.

FIG. 9 illustrates another example of the configuration of the <locationPolicy> resources according to the present invention.

In the <locationPolicy> resources according to the present invention, the location update period (locationUpdatePeriod) information may be configured in a list form unlike the location update period information described with reference to FIG. 6. Referring to FIG. 9, the location update period (locationUpdatePeriod) information is configured in a list form of lower attributes of the <locationPolicy> resources, and may have n values and expressed by 0 . . . 1(L). The top value of the list values may be executed by default. A currently used value of the location update period values set by the originator may be located and marked on the top of the list values.

Figure 10:
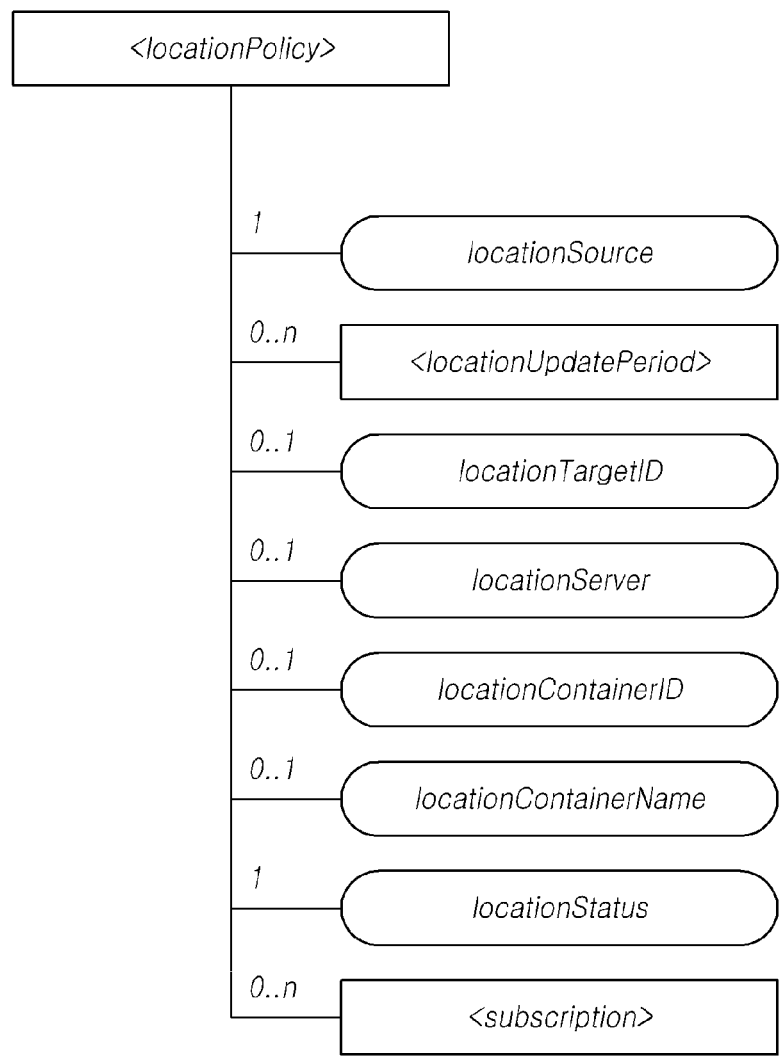
FIG. 10 illustrates another example of the configuration of the <locationPolicy> resources according to the present invention.

FIG. 10 illustrates another example of the configuration of the <locationPolicy> resources according to the present invention.

The <locationPolicy> resources according to the present invention may include location update period information in a resource form. Accordingly, the location update period information may include a period set. Referring to FIG. 10, the originator may generate or update a set having several location update periods when generating the <locationPolicy> resources. The set having the several location update periods may be generated and registered in the CSE.

Figure 11:
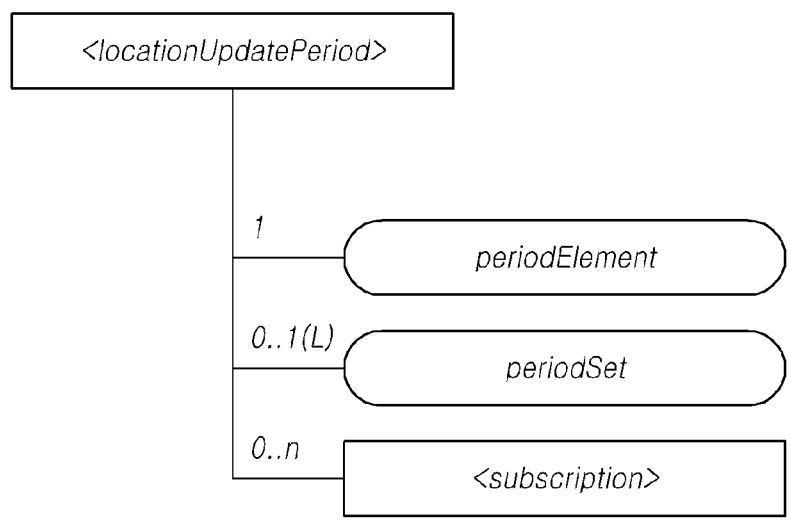
FIG. 11 illustrates an example of the configuration of locationUpdatePeriod resources according to the present invention.

FIG. 11 illustrates an example of the configuration of locationUpdatePeriod resources according to the present invention.

FIGS. 10 and 11 illustrate embodiments of changing the location update period to the resource type according to the set environment when the originator is in a state of 1:n (group). In this case, the location update period resources become child resources of the <locationPolicy> resources, and lower attributes thereof have a period element (periodElement), a period set (periodSet), and a subscription corresponding to the child resources. For example, the period element (periodElement) attribute information may include currently used location update period set values in a list form. Further, the top value in the list may be executed by default and indicates the currently used value.

According to another example, the period set (periodSet) attribute information includes a plurality of set values, each of which includes one or more available location update period values, and the top value is executed by default and indicates the currently used value. For example, a first set value may be stored as a set including location update period (locationUpdatePeriod) values related to a battery discharging speed and state, and a second set value may store a location update period value according to an application speed. Accordingly, a particular set may be selected according to location information and state information of the device, and one of the location update period values included in the selected set may be selected and used as the location update period.

Meanwhile, according to another example, the location update period information may be divided into 0 and 1(D) rather than being set as values from to n. Here, 0=not defined. Further, in a dynamic case, the location update period may be changed by the originator or the CSE. Of course, the period may be changed only by the CSE without intervention of the originator, or may be changed by the CSE. Hereinafter, an operation in the case where the location update period information is dynamic will be described with reference to FIG. 8 again.

Referring back to FIG. 8, the CSE 801 having received the response of the location information from the NSE 802 performs the internal process in S870. For example, the response including location information from the NSE 802 is included in <container> resources and is connected to the <locationpolicy> resources. Further, when the location update period (locationUpdatePeriod) is automatically changed by the CSE 801, a new value is reflected in this step.

Thereafter, the CSE 801 makes a request for location information to the NSE 802 according to the automatically changed location update period in S880. For example, when the location update period (locationupdateperiod) value is changed from 100 seconds to 20 seconds according to a hosting CSE, the register CSE 801 issues a request for the location information according to the new location update period (locationupdateperiod) value of step S870.

Thereafter, the NSE 802 generates the location information according to the request for the location information in S890. Further, the NSE 802 transfers the generated location information to the CSE 801 in S895.

Meanwhile, even when there is no request for the change from the originator 800, the CSE 801 may receive the response by receiving the dynamically changed location update period value. Further, steps S870 to S895 may be repeated according to the given conditions (velocity and battery).

Figure 12:
FIG. 12 illustrates another example of the configuration of the <locationPolicy> resources according to the present invention.

FIG. 12 illustrates another example of the configuration of the <locationPolicy> resources according to the present invention.

Figure 13:
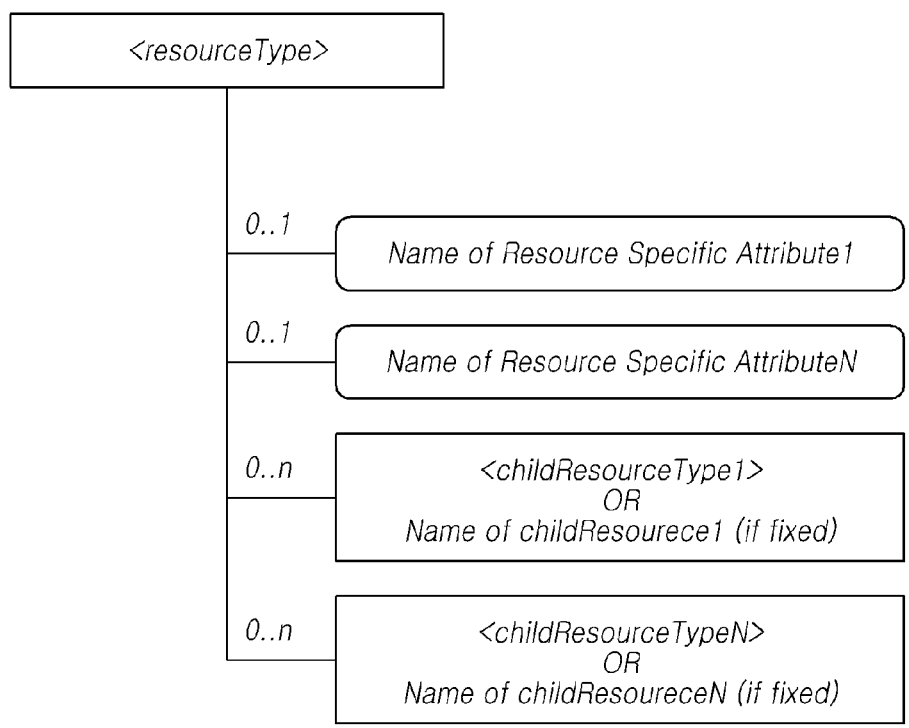
FIG. 13 illustrates an example of a configuration of <resourceType> resources according to the present invention.

Referring to FIG. 12, location update period attributes included in the <locationPolicy> resources may be set in the form of 0 . . . 1(D). In FIG. 12, it may be noted that the location update period (locationUpdatePeriod) corresponds to 0 . . . 1(D). Here, a value of "D" may be applied to another resource type as illustrated in FIG. 13, and multiplicity of attributes may be newly defined. The D value as well as 0, 1, or 0 . . . 1 may be added. In setting of the multiplicity in the resource type illustrated in FIG. 13 for the "D" value, the "D" value indicates a dynamically variable value. That is, the dynamic change may be indicated like the designation of child resources through "or" in the resource type of FIG. 13. Meanwhile, the location update period value in FIG. 12 may be dynamically changed according to a state of the device.

Table 1 shows <locationPolicy> resource attributes in FIG. 12.

Referring to Table 1, each attribute includes common attribute information and location-related attribute information including a location update period.

TABLE 1

| Attributes of <locationPolicy> | Multiplicity | RW/ RO/ WO | Description | <locationPolicyAnnc> Attributes |
|---|---|---|---|---|
| resourceType | 1 | RO | See clause 9.6.1 where this common attribute is described. | NA |
| resourceID | 1 | RO | See clause 9.6.1 where this common attribute is described. | NA |
| parentID | 1 | RO | See clause 9.6.1 where this common attribute is described. | NA |

TABLE 1-continued

| Attributes of <locationPolicy> | Multiplicity | RW/ RO/ WO | Description | <locationPolicyAnnc> Attributes |
|---|---|---|---|---|
| expirationTime | 1 | RW | See clause 9.6.1 where this common attribute is described. | NA |
| accessControlPolicyIDs | 0 . . . 1 (L) | RW | See clause 9.6.1 where this common attribute is described. | NA |
| creationTime | 1 | RO | See clause 9.6.1 where this common attribute is described. | NA |
| lastModifiedTime | 1 | RO | See clause 9.6.1 where this common attribute is described. | NA |
| labels | 0 . . . 1 | RW | See clause 9.6.1 where this common attribute is described. | NA |
| announceTo | 0 . . . 1 | RW | See clause 9.6.1 where this common attribute is described. | NA |
| announcedAttribute | 1 | RW | See clause 9.6.1 where this common attribute is described. | NA |
| locationSource | 1 | RW | Indicates the source of location information Network Based Device Based Sharing Based | OA |
| locationUpdatePeriod | 0 . . . 1(D) | RW | Indicates the period for updating location information. If the value is marked '0' or not defined, location information is updated only when a retrieval request is triggered. When the value is marked "1(D)" it means the value of locationUpdatePeriod could be changed dynamically depending on device's condition(e.q., velocity of application, status of battery, etc). | OA |
| locationTargetId | 0 . . . 1 | RW | The identifier to be used for retrieving the location information of a remote Node and this attribute is only used in the case that location information is provided by a location server. | OA |
| locationServer | 0 . . . 1 | RW | Indicates the identity of the location server. This attribute is only used in that case location information is provided by a location server. | OA |
| locationContainerID | 0 . . . 1 | RO | A URI of the <container> resource where the actual location information of a M2M Node is stored. | OA |
| locationContainerName | 0 . . . 1 | RW | A Name of the <container> resource where the actual location information of a M2M Node is stored. If it is not assigned, the hosting CSE automatically assigns a name of the resource. Note: The created <container> resource related to this policy shall be stored only in the hosting CSE. | OA |
| locationStatus | 1 | RO | Contains the information on the current status of the location request, (e.g., location server fault) | OA |

The location update period (locationUpdatePeriod) in Table 1 indicates a period on which the location information is updated. When the value is marked as 0 or not defined, the location information is updated only when a retrieval request is triggered. When the value is "1(D)", the location update period (locationupdateperiod) value is dynamically changed depending on state information of the device (an application velocity or state, or a battery). -{ }-

As described above, the location update period information according to the present invention may be dynamically changed by the CSE according to the state information of the device.

Meanwhile, the method of acquiring the location information may include a method of acquiring the location information from the network, a method by which the terminal measures and acquires the location information by itself, and a method of acquiring the location information from a neighboring different device, and the present invention can be applied to all the methods.

Hereinafter, each application example to which the location update period changing method according to the present invention described in FIGS. 14 to 17 is applied will be described with reference to the drawings.

A request message in the oneM2M environment supports 5 operations based on an operation for a destination resource. For example, the 5 operations include CREATE that makes a request for generating the resources, Retrieve that makes a request for bringing a value for the resources, UPDATE that updates a value for the resources, DELETE that deletes the resources, and NOTIFY that contains a value of the resources and notifies of the value. The operations are abbreviated to "CRUDN" and the request message may include a basically inserted parameter and a selectively used option parameter based on the corresponding operation.

FIG. 14 illustrates an example to which the present invention is applied.

FIG. 14 illustrates an example of a case where the location update period changing method according to the present invention is applied to the discovery CSF (DIS CSF) described with reference to FIGS. 2 and 3. The DIS CSF basically provides a search function for service information contained in oneM2M resources and attributes. The corresponding function is provided through a matching search method of a string value contained in a label for resources and attributes, and the originator transmitting a query for the search provides a rule for matching the label and filtering found information through filter criteria when transferring a discovery request. Among, the request parameters, fc (filter criteria) may search for resources that meet a particular condition or search for only resources generated after a particular time. Further, the fc may limit a search result. Several filter conditions may be used at the same time. When a plurality of equal conditions are used, an OR logical operation is used. When a plurality of different conditions are used, an AND logical operation is applied.

For example, with reference to FIG. 14, in order to identify if a receiver corresponds to an application having two or more location update period values, the CSE originator sends a request message based on the retrieve operation and the discovery function. In addition, the receiver may send the request under a condition of a combination of a keyword of "locationUpdatePeriod" as the filter criteria and sematic information for changing the location update period value in a particular area. The receiver searches for a function, resources, and attributes corresponding to the condition of the filter criteria and then returns a proper value, wherein a URI list of the found resources is transferred as the search return value. In order to search for locationUpdatePeriod attributes in more detail, various search conditions such as a generation time of information on a location update period value, a matching string value, a maximum number of search returns, and an order of update values (ascending and descending orders) may be set in options of the request message parameter. Accordingly, a corresponding M2M system and an attribute value corresponding to the M2M system may be found.

In the above, the example to which the discovery CSF is applied even when a plurality of location update period values are included has been described through the application of the present invention.

Figure 15A:
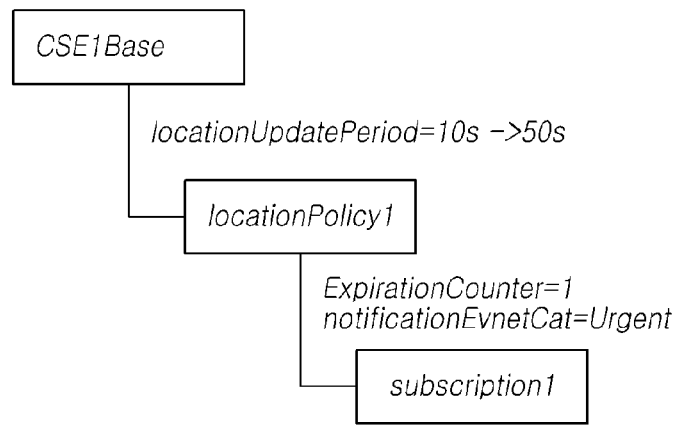
FIGS. 15A and 15B illustrates another example to which the present invention is applied.
Figure 15B:
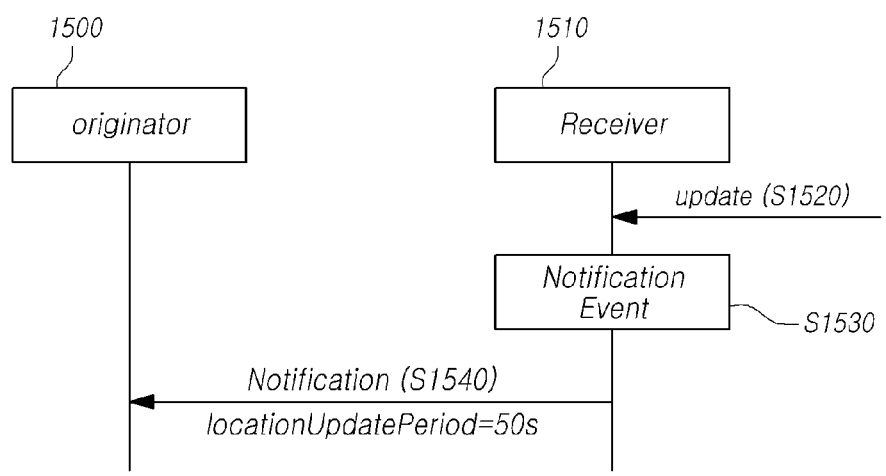

FIGS. 15A and 15B illustrate another example to which the present invention is applied.

FIGS. 15A and 15B illustrate an example of a case where the location update period changing method according to the present invention is applied to the SUB CSF (Subscription and Notification CSF) described with reference to FIGS. 2 and 3. Subscription resource attributes may be divided into subscription attributes (expirationCounter), notification attributes (notificationEventCat), a notification address (notificationURI), and a notification event filter (notificationEventCriteria), and can be notified when desired data is changed through attribute information of <subscription> resources. The SUB CSF may operate even when the location update period is changed by the aforementioned changing method according to the present invention.

As illustrated in FIG. 15A, the location update period value may be updated to a new value according to the changing method according to the present invention, or a location information value may be changed. For example, through the change in the state information of the device or the change in the location, the location update period value may be dynamically changed by the aforementioned method. For example, the location update period value may be changed from 10 s to 50 s. In this case, changed information may be notified of to a subscriber who subscribes to the corresponding resources. Accordingly, when the subscription information is generated, resource URI information to which a notification message is transmitted is contained in information to be notified of, that is, notification URI information. The subscriber should specify information that the subscriber desires to be notified when an event is generated, and this information is expressed in the filter criteria.

As illustrated in FIG. 15B, according to the changing method of the present invention, the location update period value may be updated or all of the <locationpolicy> resources including location update period attribute information may be updated, generated, or deleted in S1520. In this case, a notification event to be notified of to the subscriber is generated in S1530. In this event, a receiver 1510 may notify an originator 1500 of the notification URI information specified by the subscriber and, in connection with the subscription, the subscriber may subscribe a change in a single resource or may subscribe to group resources.

Meanwhile, even when the location update period changing method according to the present invention is applied, subscription by a schedule is possible. For example, a location information change in a particular time zone may be subscribed using <schedule> resources. <schedule> resources corresponding to child resources of the <subscription> resources indicate when a notification message arrives at the receiver. Accordingly, when the location update period (locationUpdatePeriod) is automatically changed into another value within the receiver CSE according to each embodiment of the present invention and the receiver desires to receive the changed content of the location update period value only for a particular time, the receiver may set a notification time in attribute information of <schedule> resources corresponding to child resources of the <subscription> resources through the scheduleElement. Therefore, even when the location update period is dynamically changed, the corresponding information may be received only during a particular time.

Figure 16:
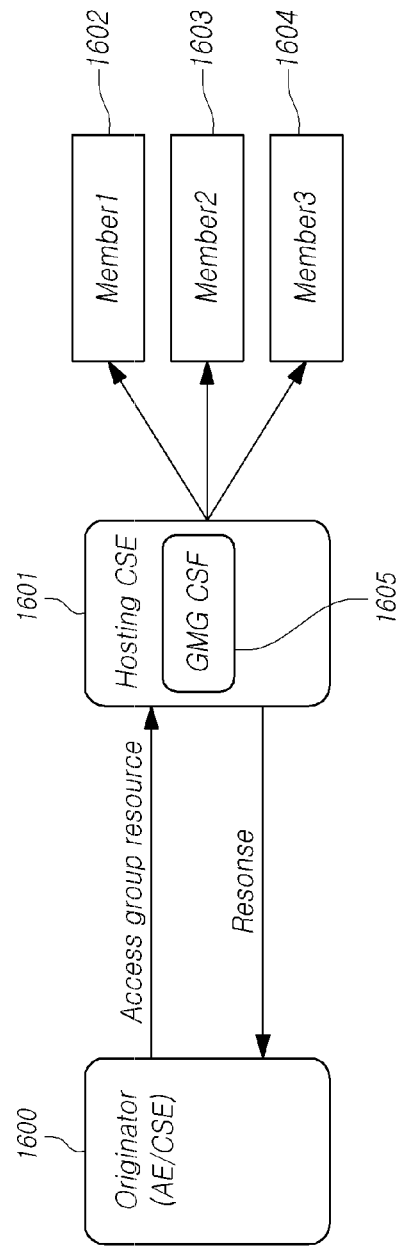
FIG. 16 illustrates another example to which the present invention is applied.

FIG. 16 illustrates another example to which the present invention is applied.

FIG. 16 illustrates an example of a case where the location update period changing method according to the present invention is applied to the GMG CSF (Group Management CSF) described with reference to FIGS. 2 and 3. As described above, the group management (GMG) CSF serves to handle a request related to a group. Further, the GMG CSF serves to help in operating a plurality of interesting resources at one time and combining results. That is, the originator may transmit a request message to group resources at one time, so as to transfer the request message to all member resources belonging to the group resources, which is called a bulk operation. Further, the GMF collects result responses for the member resources belonging to the group after performing the bulk operation and respond to the originator having made the request for the bulk operation. It is assumed that only members having the same access rights are grouped as the resources belonging to the group resources, and the GMG CSF serves to verify whether the members have the same access rights. Since group resources can be included as the member, the group resources serve to perform recursive processing on successive groups, and may also collect responses to the successive groups and transfer the responses to the originator.

Referring to FIG. 16, there are members #1, #2, and #3 1602, 1603, and 1604 that are receiver CSEs of the <locationpolicy> resources. According to the location update period changing method, member #1 1602 may have a location update period (locationUpdatePeriod) value which changes on a period of 10 seconds or 5 seconds according to battery settings of the DMG CSF. Further, members #2 and #3 1603 and 1604 may also have different location update period values.

In this case, a GMG CSF 1605 may allow members #1, #2, and #3 1602, 1603, and 1604 to be one group, and may add results of the members and transmit the added result to a hosting CSE 1601. That is, it is possible to simultaneously manage the location information update service by grouping a plurality of M2M devices as necessary. Further, as illustrated in FIG. 16, it is possible to unify location update periods and update the unified location update period by grouping members #1, #2, and #3 1602, 1603, and 1604 as one group. That is, by grouping one or more members, the location update period method according to the present invention may be applied at one time. Further, there may be a plurality of groups. Meanwhile, subscription information of the group is generated only when a subscriber is interested in states of all members of the group. For example, when location information of the members is changed according to the location update period (locationUpdatePeriod) or when the location update period (locationUpdatePeriod) value selected according to the method of the present invention is changed, the GMG CSF 1605 manages the subscription information of the group. After the subscription information of the group is made, the GMG CSF 1605 collects notifications from the group members and notifies the subscriber of the notifications. Further, response and event notifications therefor may be selectively transferred to the originator 1600 according to the filter criteria.

As described above, in a case of the group management, the location update period changing method according to the present invention may be applied.

Figure 17:
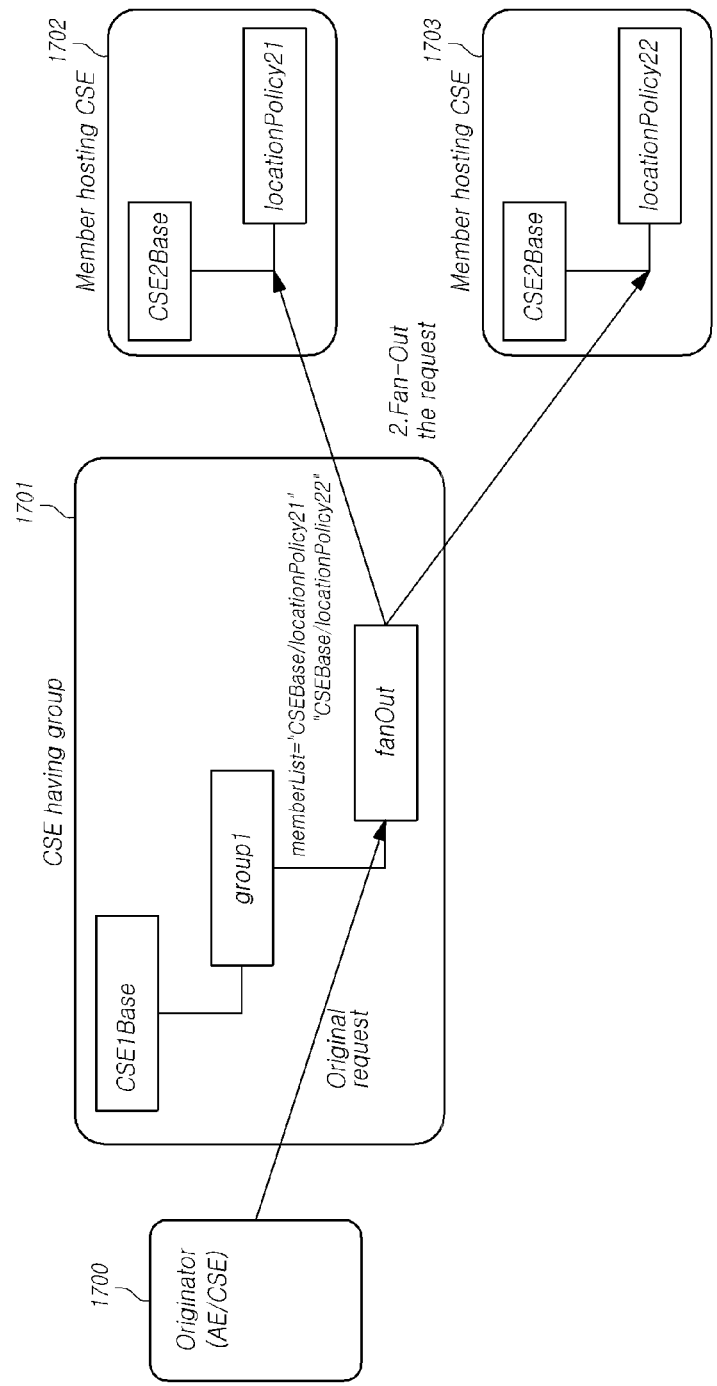
FIG. 17 illustrates another example to which the present invention is applied.

FIG. 17 illustrates another example to which the present invention is applied.

FIG. 17 illustrates a method of accessing multiple data or services based on a single group. A group function provides a simple access function for one or more resources corresponding to group members. For example, through a single acquisition request for 100<locationPolicy> resources instead of 100 requests for the corresponding group resources, 100 pieces of resource information can be acquired. Accordingly, in order to use such a group member single access function, member resources should be first generated as the group resources. The group resources basically include virtual resources that may transmit a member list and a group request. An originator 1700 using the group function first specifies a group member resource list and group attributes and makes a request for generating the group resource. That is, when the group resources are successfully generated in the 100 group members, virtual resources (fanOut) are automatically generated. When a "CRUDN" request is transmitted to the corresponding resources, a CSE 1701 having the group fans out the request to all member resources of the corresponding group. At this time, originator information (fr) of the fan-out request is still maintained from the original information of the originator 1700. Members 1702 and 1703 having received the fanned out request consider the request as the request originally transmitted by the originator 1700 and process the corresponding request through an access control. After this, a request processing result is transmitted to the CSE 1701 having the group, and the CSE 1701 having the group collects response messages transmitted from the members 1702 and 1703 and transfers the response message to the original originator 1700.

Accordingly, when the <locationPolicy> resources are generated in group member resources through the group, an addition function is provided to subscription resources. Through the update, the originator 1700 may change the same location update period (locationUpdatePeriod) value of all members 1701, 1702, and 1703 through the group. By generating subscription resources, a group subscription generator may receive changes in locations of the group members and in the location information update period through the same notification address. At this time, individual notification messages from the members may be collected and transferred by the CSE 1701 having the group.

As described above, the location update period changing method according to the present invention may be used through the application to the conventional various CSFs.

Figure 18:
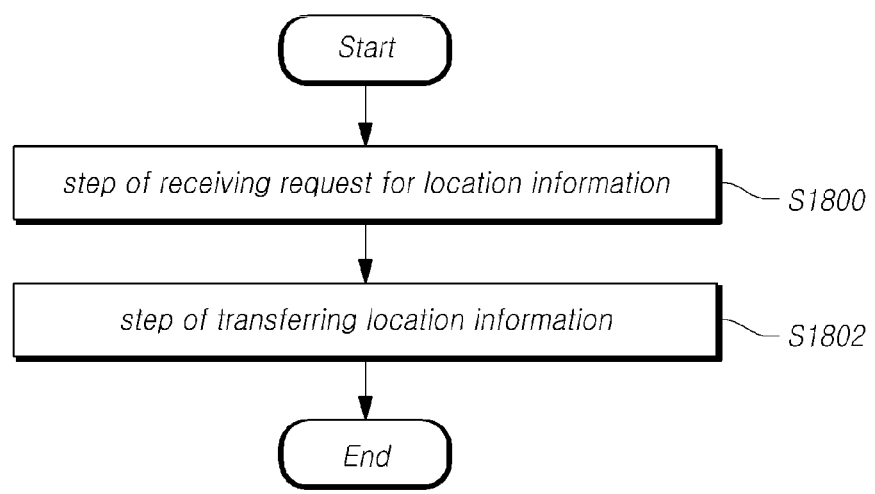
FIG. 18 illustrates an operation of a network service entity according to an embodiment of the present invention.

FIG. 18 describes the present invention again in terms of the network service entity.

A method of providing location information by a network service entity according to an embodiment of the present invention may include a step of receiving a request for location information of a device from a common service entity according to a period determined based on location update period information, and a step of transferring the location information of the device to the common service entity. Here, the location update period information may be dynamically changed based on at least one piece of the location information of the device and state information of the device by the common service entity.

Referring to FIG. 18, the method by the Network Service Entity (NSE) according to the present invention may include a step of receiving a request for the location information of the device from the common service entity according to a period determined based on location update period information in S1800. As described above, the location update period information may include list information including one or more location update period values. Alternatively, the location update period information may include period set attribute information including one or more location update period sets that have been classified and set according to each type of state information of the device. For example, each of the location update period sets may be list information including one or more location update period values that have been set according to state information of the device. Alternatively, the location update period information may include period element attribute information including a location update period value applied to the making of the request for the current location information of the device. Meanwhile, the state information of the device may include at least one piece of power information, speed information, absolute location information, relative location information of a previous location, time information, and application execution information.

Further, the method by the network service entity according to the present invention may include a step of transferring the location information of the device to the common service entity in S1802. A method of acquiring the location information of the device may include a method of acquiring the location information from the network, a method by which the terminal measures and acquires the location information by itself, and a method of acquiring the location information from a neighboring different device, and the present invention can be applied to all the methods.

Meanwhile, when the update period is changed according to the location update period changing method, the network service entity may receive a location information request according to the changed period.

Each of the common service entity and the network service entity that may perform all of the present invention described with reference to FIGS. 1 to 18 may include elements required for performing the present invention.

For example, the common service entity that acquires the location information according to the present invention may include a controller for generating location policy (location-Policy) resources according to a request of the originator and a transmitter for making a request for location information of the device to the network service entity according to location update period (locationUpdatePeriod) information included in the location policy information. The controller may change location update period information based on at least one piece of the location information received from the network service entity and state information of the device.

According to another example, the network service entity that provides the location information according to the present invention may include a receiver for receiving a request for location information of the device from the common service entity according to a period determined based on location update period information, and a transmitter for transferring the location information of the device to the common service entity. As described above, the location update period information may be dynamically changed by the common service entity based on at least one piece of the location information of the device and the state information of the device, and the network service entity may receive a location information request according to the changed location update period.

Although a preferred embodiment of the present invention has been described for illustrative purposes, those skilled in the art will appreciate that various modifications, additions and substitutions are possible, without departing from the scope and spirit of the invention as disclosed in the accompanying claims. Accordingly, the embodiments disclosed in the present invention are only for describing, but not limiting, the technical idea of the present invention, and the scope of the technical idea of the present invention is not limited by the embodiments. The scope of the present invention shall be construed on the basis of the accompanying claims in such a manner that all of the technical ideas included within the scope equivalent to the claims belong to the present invention.

The invention claimed is:

1. A method of acquiring location information by a common service entity in a machine to machine (M2M) system, the method comprising:
generating, by the common service entity, location policy resources according to a request of an originator;
making, by the common service entity, a request for location information of a device to a network service entity according to location update period information included in the location policy resources; and
changing, by the common service entity, the location update period information based on at least one piece of the location information received from the network service entity and state information of the device,
wherein the location update period information includes list information including a plurality of location update period values; and
wherein the changing includes:
selecting, by the common service entity, a location update period value from the plurality of location update period values, based on at least one piece of the location information received from the network service entity and the state information of the device; and
applying, by the common service entity, the selected location update period value as an update period for the location information request.

2. The method of claim 1, wherein the changing of the location update period information comprises, when there is no request of the originator, independently changing the location update period information based on at least one piece of the location information and the state information of the device.

3. The method of claim 1, wherein the making of the request for location information of the device comprises making the request for the location information of the device to the network service entity based on a first location update period value of the list information.

4. The method of claim 1, wherein the location update period information includes period set attribute information including one or more location update period sets that have been classified and configured according to each type of state information of the device.

5. The method of claim 4, wherein each of the location update period sets corresponds to list information including one or more location update period values configured according to the state information of the device.

6. The method of claim 4, wherein the location update period information includes period element attribute information including a location update period value applied to the making of the request for the location information of the device to the network service entity.

7. The method of claim 1, wherein the location policy information is changed according to a request for updating the location policy information from the originator.

8. The method of claim 1, wherein the state information of the device includes at least one piece of power information, speed information, absolute location information, relative location information of a previous location, time information, and application driving information.

9. A method of providing location information by a network service entity in a machine to machine (M2M) system, the method comprising:
receiving, by the network service entity, a request for location information of a device from a common service entity based on a period determined according to location update period information; and
transferring, by the network service entity, the location information of the device to the common service entity,
wherein the location update period information is dynamically changed by the common service entity based on at least one piece of the location information of the device and state information of the device;
wherein the location update period information includes list information including a plurality of location update period values; and
wherein the dynamically changing of the location update period information includes:
selecting, by the common service entity, a location update period value from the plurality of location update period values, based on at least one piece of the location information received from the network service entity and the state information of the device; and applying, by the common service entity, the selected location update period value as an update period for the location information request.

10. The method of claim 9, wherein the location update period information includes period set attribute information including one or more location update period sets that have been classified and configured according to each type of state information of the device.

11. The method of claim 10, wherein each of the location update period sets corresponds to list information including one or more location update period values configured according to the state information of the device.

12. A common service entity for acquiring location information in a machine to machine (M2M) system, the common service entity comprising:

a controller configured to generate location policy resources according to a request of an originator; and a transmitter configured to make a request for location information of a device to a network service entity according to location update period information included in the location policy resources, wherein the controller changes the location update period information based on at least one piece of the location information received from the network service entity and state information of the device;

wherein the location update period information includes list information including a plurality of location update period values; and wherein the changing of the location update period information includes:

selecting a location update period value from the plurality of location update period values, based on at least one piece of the location information received from the network service entity and the state information of the device; and applying the selected location update period value as an update period for the location information request.

13. The common service entity of claim 12, wherein, when there is no request of the originator, the controller independently changes the location update period information based on at least one piece of the location information and the state information of the device.

14. The common service entity of claim 12, wherein the transmitter makes a request for the location information of the device to the network service entity based on a first location update period value of the list information.

15. The common service entity of claim 12, wherein the location update period information includes period set attribute information including one or more location update period sets that have been classified and configured according to each type of state information of the device.

16. The common service entity of claim 15, wherein each of the location update period sets corresponds to list information including one or more location update period values configured according to the state information of the device.

17. The common service entity of claim 15, wherein the location update period information includes period element attribute information including a location update period value applied to the making of the request for the location information of the device to the network service entity.

\* \* \* \* \*